United States Patent [19]
Ash

[11] Patent Number: 5,929,150
[45] Date of Patent: Jul. 27, 1999

[54] POLYKETONE SOLVENTS

[75] Inventor: Carlton Edwin Ash, Sugar Land, Tex.

[73] Assignee: Shell Oil Company, Houston, Tex.

[21] Appl. No.: 09/128,830

[22] Filed: Aug. 4, 1998

Related U.S. Application Data

[60] Provisional application No. 60/061,157, Oct. 6, 1997.

[51] Int. Cl.$^6$ .................................. C08J 5/00; C08K 5/07
[52] U.S. Cl. ......................... 524/356; 524/432; 528/392; 528/220; 528/222; 528/225
[58] Field of Search ..................... 524/356, 432; 528/392, 220, 222, 225

[56] References Cited

U.S. PATENT DOCUMENTS

| | | | |
|---|---|---|---|
| 2,648,646 | 8/1953 | Stanton et al. | 260/29.6 |
| 4,618,630 | 10/1986 | Knobel et al. | 521/105 |
| 4,808,699 | 2/1989 | van Broekhoven et al. | 528/392 |
| 4,868,282 | 9/1989 | van Broekheven et al. | 528/392 |
| 4,880,903 | 11/1989 | van Broekhoven et al. | 528/392 |
| 4,880,904 | 11/1989 | Kinneberg et al. | 528/392 |
| 5,205,965 | 4/1993 | Uetani et al. | 252/500 |
| 5,407,982 | 4/1995 | Ash | 524/106 |
| 5,486,581 | 1/1996 | Ash | 525/539 |

FOREIGN PATENT DOCUMENTS

| 2042414 | 2/1980 | United Kingdom | D01D 5/04 |
|---|---|---|---|

OTHER PUBLICATIONS

Zinc Compounds, Thomas B. Lloyd, Walter Showak, vol. 24, pp. 851–863.

Fiber Chemistry, Handbook of Fiber Science and Technology: vol. IV, M. Lewin and E. Pearce, pp. 171, 244–249.

*Primary Examiner*—Duc Truong
*Attorney, Agent, or Firm*—Todd F. Volyn

[57] ABSTRACT

A polyketone solution is prepared by the dissolution of alternating aliphatic polyketone in a solution of $ZnX_2$. X can be Cl, Br, or I. At a given temperature, these solvents completely dissolve polyketone when aqueous or organic solutions are made from particular concentrations.

13 Claims, No Drawings

POLYKETONE SOLVENTS

This application claims the benefit of U.S. Provisional Application Ser. No. 60/061,157 filed Oct. 6, 1997, the entire disclosure of which is hereby incorporated by reference.

BACKGROUND OF THE INVENTION

This invention relates to solvents for alternating aliphatic polyketones and their use in the preparation of polyketone solutions.

Polymers of carbon monoxide and ethylenically unsaturated hydrocarbons commonly referred to simply as aliphatic polyketones have been known for some time. High molecular weight alternating aliphatic polyketones (hereafter, "polyketones") are of considerable interest because they exhibit a good overall set of physical and chemical properties. This class of polymers is disclosed in numerous U.S. patents assigned to Shell Oil Company exemplified by U.S. Pat. Nos. 4,880,903 and 4,880,904 which are incorporated herein by reference. These polymers are relatively high molecular weight materials having a breadth of useful properties giving them established utility as premium thermoplastics in the production of shaped articles such as gears, bearings, pipes, hose, connectors, fiber and parts for the automotive industry. The polymers display high strength, rigidity, and toughness among other favorable properties which they retain under a wide range of conditions such as temperature, moisture, and the presence of harsh chemical agents. For example, thinly molded parts comprised of polyketones have shown excellent property retention in concentrated acidic solutions.

To date, few reagents have been found useful as solvents for polyketones. The few reagents which can be used in this regard are expensive or can pose safe handling difficulties. Hexafluoroisopropanol (HFIPA) and m-cresol are examples of such solvents. To date, HFIPA has been the only solvent known to be capable of completely dissolving polyketones at ambient temperatures (23° C.)

It would be useful to have a number of solvents for polyketones so that polymer solutions could be prepared. This could make available a number of technologies not generally associated with such polymers. Solution spinning of polyketone fibers, for example, would be greatly advanced by such a development.

SUMMARY OF THE INVENTION

A polymer solution is presented comprising a polyketone in the presence of a $ZnX_2$ solvent under dissolution conditions. X is selected from the group consisting of chlorine, bromine, and iodine.

In another aspect of this invention, a polyketone solvent is presented comprising $ZnX_2$. X is selected from the group consisting of chlorine, bromine, and iodine.

A method of preparing polyketone solutions is also presented. The method comprises contacting polyketone with a $ZnX_2$ solvent under dissolution conditions. X is selected from the group consisting of chlorine, bromine, and iodine.

In another aspect of this invention, a method of recovering polyketone from a solution is presented comprising the steps of reducing the solvent ion concentration from a polyketone solution until dissolution conditions are no longer present, and recovering solid or slurry polyketone from the solution.

DETAILED DESCRIPTION OF THE INVENTION

The polyketone polymers which are employed in this invention are of an alternating structure and contain substantially one molecule of carbon monoxide for each molecule of ethylenically unsaturated hydrocarbon. It is possible to employ a number of different ethylenically unsaturated hydrocarbons as monomers within the same polymer but the preferred polyketone polymers are copolymers of carbon monoxide and ethylene or terpolymers of carbon monoxide, ethylene and a second ethylenically unsaturated hydrocarbon of at least 3 carbon atoms, particularly an a-olefin such as propylene. Additional monomers can also be used and still come within the scope of polyketone polymers described herein. That is, polyketone polymers can be made from four, five, or more combinations of monomers. Such polyketone polymers are aliphatic in that there is an absence of aromatic groups along the polymer backbone. However, alternating polyketones may have aromatic groups substituted or added to side chains and yet still be considered alternating aliphatic polyketones. Moreover, the polyketones used in this invention can be blends with any number of other polymers and materials. Some blends could incorporate aromatic materials and polymers. Nevertheless, the polyketone polymer component is still considered to be of the alternating aliphatic type.

When the preferred polyketone terpolymers are employed, there will be within the terpolymer at least about 2 units incorporating a moiety of ethylene for each unit incorporating a moiety of the second or subsequent hydrocarbon. Preferably, there will be from about 10 units to about 100 units incorporating a moiety of the second hydrocarbon. The polymer chain of the preferred polyketone polymers is therefore represented by the repeating formula

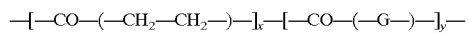

where G is the moiety of ethylenically unsaturated hydrocarbon of at least three and no more than 20 carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the —CO—(—CH$_2$CH$_2$—)— units and the —CO—(—G—)— units are found randomly throughout the polymer chain, and preferred ratios of y:x are from about 0.01 to about 0.1. The precise nature of the end groups does not appear to influence the properties of the polymer to any considerable extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer, and in the case of terpolymers the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, of from about 0.5 dl/g to about 10 dl/g, more frequently of from about 0.8 dl/g to about 4 dl/g. The backbone chemistry of aliphatic polyketones precludes chain scission by hydrolysis. As a result, they generally exhibit long term maintenance of their property set in a wide variety of aqueous environments. This is in contrast to a material such as nylon 6,6 which suffers the consequences of both hydrolysis and more severe plasticization.

Processes for the production of the polyketone polymers are illustrated by U.S. Pat. Nos. 4,808,699 and 4,868,282 to Van Broekhoven, et. al. which issued on Feb. 28, 1989 and Sep. 19, 1989 respectively and are incorporated herein by reference. Both patents teach the production of alternating polymers by contacting ethylene and carbon monoxide in the presence of a catalyst comprising a Group VIII metal compound, an anion of a nonhydrohalgenic acid and a bidentate phosphorous, arsenic or antimony ligand.

A polyketone solution, as the term is used throughout this specification, is a solution of polyketone dissolved in a liquid solvent without significant change to the molecular structure of polyketone. That is, a polyketone solution comprises polyketone, identifiable as such, in the liquid state. Standard means of characterizations such as NMR will readily reveal that the solution contains alternating aliphatic polyketone.

The solvents of this invention are prepared as solutions and dissolve the polyketone under dissolution conditions. These dissolution conditions include solvent ion concentration, concentration of polyketone in solvent, and temperature. The solvents of this invention are comprised of $ZnX_2$ dissolved in water and/or polar organic medium. Water is the most preferred medium in which the solvents are prepared. Lower alcohols such as methanol are the most preferred polar organic medium. Other polar organic media can include ketones, amides, esters, lactams, lactones, and the like. No special steps or methods are necessary to prepare the solvent solutions of this invention. They are easily prepared by any person of ordinary skill according to well known methods. Concentrations of polyketone relative to solvent is less than about 25% wt (based upon total weight of polyketone and solvent).

When the solvent is an aqueous solution of $ZnCl_2$, the salt (ion) concentration must be greater than about 61% wt (based on total weight of water and salt) at 23° C. As one increases the temperature, the salt (ion) content of the solvent concentration can be lowered. Thus, at 95° C. one may use a salt (ion) concentration of greater than about 56% wt (based on total weight of water and salt) $ZnCl_2$, to completely dissolve the polymer. For practical purposes, a linear relationship between solvent concentration and temperature can generally be interpolated between these concentrations and temperatures and can be extrapolated to the practical limits of solubility of $ZnCl_2$. When the solvent is an aqueous solution of $ZnBr_2$, the salt (ion) concentration must be greater than about 70% wt (based on total weight of water and salt) at 60° C. When the solvent is an aqueous solution of $ZnI_2$, the salt (ion) concentration must be greater than about 59% wt (based on total weight of water and salt) at 60° C. $ZnCl_2$ is the most preferred solvent.

$ZnF_2$ is not a solvent according to this invention.

The solutions of this invention are prepared by dissolving polyketone in the solvents described above. Some addition of mixing power is helpful but this merely accelerates dissolution and does not cause it. No special methods or techniques are necessary. It is preferred that a solution of appropriate concentration of solvent be prepared for the given operating temperature range as described above. Quantities of solvent solution are prepared such that there will be at least a minimal excess of concentration of solvent relative to polyketone according to the prescribed solvent/polyketone ratio described above. Solutions so formed are generally stable and may be stored in any type of vessel which does not permit osmosis, reaction, leaching, or evaporation of solvent solution.

Polyketone can be readily precipitated or otherwise removed from solution by reducing the salt (ion) concentration of solvent such that it is outside of the ranges required for dissolution at a given temperature. Thus, polyketone can be removed from an aqueous solution of polyketone in $ZnCl_2$ by reducing the $ZnCl_2$ concentration to less than 61% wt at 23° C. This can be done through the addition of water and/or organic polar media, through the precipitation of $ZnCl_2$ by the addition of a reagent such as silver nitrate, or through other means of salt (ion) removal of solvent (e.g., by ion exchange or osmosis). The polyketone is then recovered as a solid or slurry. The polymer is then generally rinsed with a reagent such as water to further reduce the presence of residual salt (ion).

The dissolution of polyketones is useful in removing polyketone from objects that are coated with polyketone. They may also be used to form polyketone films by preparing thin layers of polyketone solutions and then removing the solvent. Objects may be coated or encapsulated by contacting, as by dipping, the object into a solution of the polyketone solution, removing the excess solution, and then removing the solvent. The solutions of the instant invention can also be used to spin fibers, as for example by solution spinning.

This invention is further described by the following nonlimiting examples.

EXAMPLE 1
(Polyketone Formation)

A terpolymer of carbon monoxide, ethylene, and propylene was produced in the presence of a catalyst composition formed from palladium acetate, the anion of triflouroacetatic acid and 1,3-bis(diphenylphosphino)-propane. The melting point of the linear terpolymer was 220° C. and it had a limiting viscosity number (LVN) of 1.75 measured at 60° C. in m-cresol.

EXAMPLE 2
(Dissolution of Polyketone)

In this example, polyketone polymer as described in example 1 was formed into pellets. 0.1 gms of such polyketone pellets were placed into test tubes containing 22 gms of $ZnCl_2$ concentrations ranging from 50 to 65% wt (based on weight of salt (ion) and water) in 1% increments. Complete dissolution of polymer occurred at concentrations of 62% wt and above after 69 hours at 23° C.

EXAMPLE 3
(Dissolution of Polyketone)

Example 2 was repeated except that the temperature was 60° C. Complete dissolution occurred at concentrationso of 60% and above within about 18 hours at this temperature.

EXAMPLE 4
(Dissolution of Polyketone)

Example 2 was repeated except that the temperature was 95° C. Complete dissolution occurred at concentrationso of 58% and above within about 18 hours at this temperature.

EXAMPLE 5
(Characterization)

Polymer produced according to Example 1 was injection molded into ASTM D638, type V tensile bars weighing about 1.75 gms/bar. A tensile bar was submerged in a glass jars containing about 50 ml of a 65% wt (based on weight of salt (ion) plus water) aqueous $ZnCl_2$ solutions at about 60° C. for 120 hours. The polymer completely dissolved. $C^{13}$ NMR analysis of the solution revealed the presence of polyketone without any change in molecular structure of the polymer.

A 15 ml aliquot of the polymer solution was removed and the polymer recovered from it by the addition of about 16 ml water followed by decantation. The precipitate was then washed with copious amounts of water and then the product was dried at 60° C. overnight in vacuum under nitrogen purge. The percipate and a sample of the polymer from which it originated was then submitted to GPC analysis using HFIPA as a solvent and found to be nearly identical in molecular weight distribution. No generation of low molecular weight species were observed.

This example shows the stability of the polymer solutions produced according to this invention.

EXAMPLE 6
($ZnBr_2$)

Tensile bars described in Example 5 were prepared. One tensile bar was immersed in 50 ml of solutions of $ZnBr_2$ at 60° C. in each of the concentrations represented below. Observations were made at 72 hours. Results appear in Table I.

TABLE I

| [$ZnBr_2$] (wt %) | 55 | 60 | 65 | 75% |
| --- | --- | --- | --- | --- |
| Observation | No Dissolution | No Dissolution | Discoloration (after 2k hrs) | Complete dissolution |

EXAMPLE 7
($ZnI_2$)

Tensile bars described in Example 5 were prepared. One tensile bar was immersed in 50 ml of solutions of $ZnI_2$ at 60° C. at concentrations of 55 and 60% (based on weight of salt (ions) and water). Observations were made at 312 hours. Complete dissolution was observed at concentrations of 60%. At 55% no dissolution was observed.

EXAMPLE 8
(Polyketone/Solvent Range)

50 ml solutions of 65% and 70% $ZnCl_2$ (based on weight of salt (ion) and water) were prepared. A Type V tensile bar of the polyketone of example 1 was added to each solution sample at 60° C. Additional bars were added to each sample as dissolution occured to determine the solubility limit of polyketone in the solvent. Viscous solutions were formed in each case. A maximum amount of 9.5% and 12.5% of polyketone polymer could be dissolved in these solutions respectively.

The example was repeated at 23° C. for the 65% solvent only. Here a maximum of 7.5% polyketone polymer was soluble. From this data, it is believed that no more than about 25% wt of polyketone (based on total weight of polymer and solvent) can be dissolved in the solutions of this invention.

EXAMPLE 9
(Organic Medium-Prophetic)

A 50 and 62% wt (based on weight of salt(ion) and methanol) solvent comprising $ZnCl_2$ and methanol were prepared. Pellets prepared from polyketone described in Example 1 are immersed in these solvents at 60° C. Dissolution occurs in the 62% solvent. This illustrates that solvents according to this invention can be prepared from polar organic media.

I claim as my invention:

1. A polymer solution comprising a polyketone in the presence of a solution of $ZnX_2$ under dissolution conditions wherein X is selected from the group consisting of chlorine, bromine, and iodine.

2. The polymer solution of claim 1 wherein X is Br.

3. The polymer solution of claim 1 wherein X is Cl.

4. The polymer solution of claim 1 wherein the $ZnCl_2$ concentration is greater than 61% wt (based on total weight of salt and water) at 23° C.

5. The polymer solution of claim 1 wherein X is I.

6. The polymer solution of claim 1 wherein $ZnX_2$ is an aqueous or polar organic solution.

7. A polyketone solvent comprising aqueous $ZnX_2$ wherein X is selected from the group consisting of chlorine, bromine, and iodine.

8. The solvent of claim 7 wherein X is Cl and $ZnX_2$ is present in concentrations greater than about 61% wt (based on total weight of salt and water) at 23° C.

9. The solvent of claim 7 wherein X is Br.

10. A method of preparing polyketone solutions comprising contacting polyketone with aqueous $ZnX_2$ under dissolution conditions wherein X is selected from the group consisting of chlorine, bromine, and iodine.

11. A method of recovering polyketone from a solution comprising the steps of reducing salt concentration of a polyketone solution until dissolution conditions are no longer present, and recovering solid or slurry polyketone from the solution.

12. The method of claim 11 wherein salt concentration is reduced by the addition of water and/or polar organic media.

13. The method of claim 11 wherein salt is extracted from the solution.

\* \* \* \* \*